March 26, 1963  R. O. BALOGH  3,082,842

MOBILE WORK PLATFORMS

Filed Aug. 10, 1956  4 Sheets-Sheet 1

*INVENTOR.*
ROY O. BALOGH
BY *Alfred W. Petchaft*
ATTORNEY

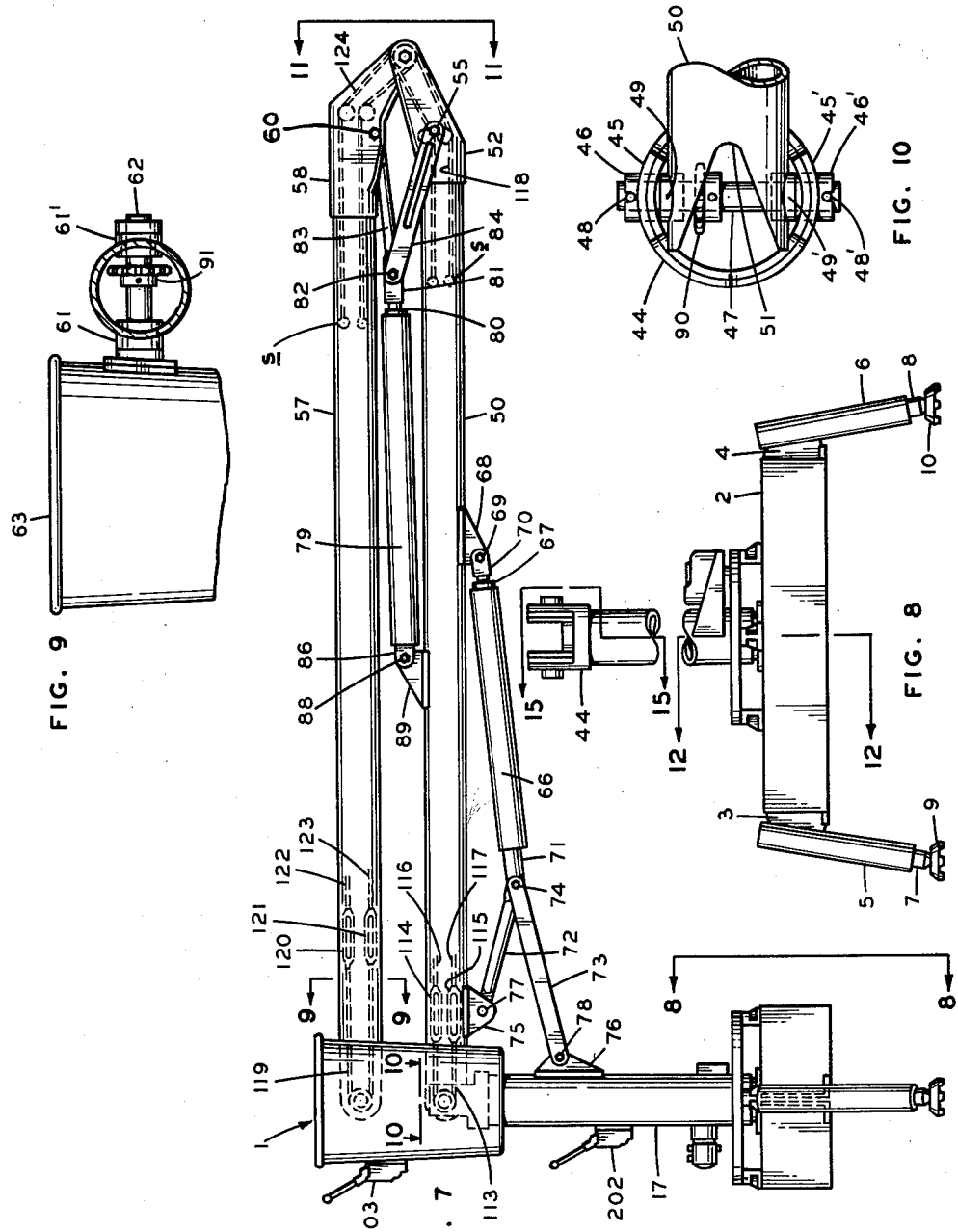

March 26, 1963 R. O. BALOGH 3,082,842
MOBILE WORK PLATFORMS
Filed Aug. 10, 1956 4 Sheets-Sheet 3
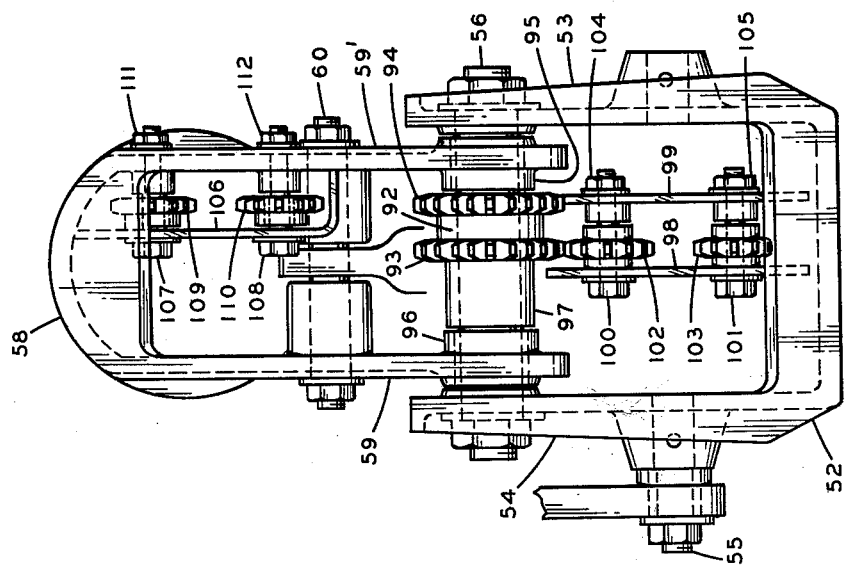
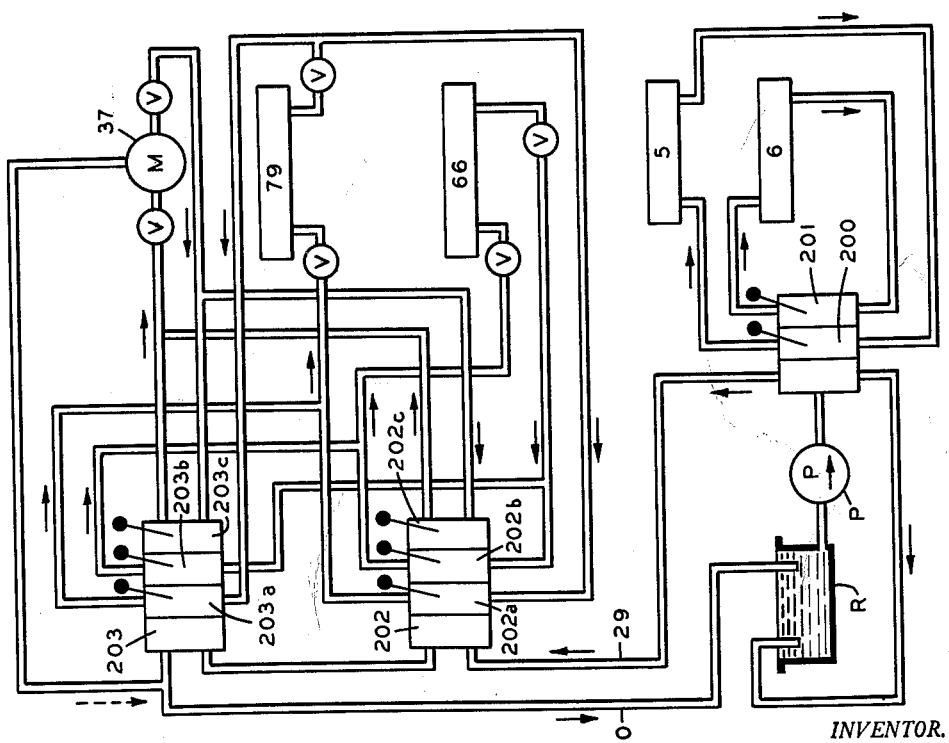
INVENTOR.
ROY O. BALOGH
BY
ATTORNEY March 26, 1963

R. O. BALOGH 3,082,842

MOBILE WORK PLATFORMS

Filed Aug. 10, 1956

INVENTOR.
ROY O. BALOGH
BY
ATTORNEY

United States Patent Office 3,082,842
Patented Mar. 26, 1963

3,082,842
MOBILE WORK PLATFORMS
Roy O. Balogh, Clayton, Mo., assignor to McCabe-Powers Body Company, a corporation of Missouri
Filed Aug. 10, 1956, Ser. No. 603,424
4 Claims. (Cl. 182—2)

This invention relates in general to certain new and useful improvements in mobile work platforms and, more particularly, to a boom-mounted device for positioning and supporting workmen during the installation and servicing of elevated utility equipment such as power lines, street lighting standards, and the like.

In the installation and servicing of elevated utility equipment it is desirable to provide a safe and efficient means for lifting workmen up to the equipment so that the necessary operations can be made. The stages, baskets, cages or carriages upon which the workman stands or in which he is supported are commonly referred to in this industry by the all-inclusive term "work platforms." It is desirable that such means be capable of a wide range of selective positioning, both vertically and laterally, so that once the vehicle is driven to the general location of the work, the device in which the workman stands can be used to transport the workman to the most convenient position from which to operate. Frequently, the equipment to be serviced is found in a location to which a vehicle may have only a limited access thereby necessitating considerable flexibility in the operation of the work platform and its associated mechanism. Also, it often happens that a number of repairs are within a limited distance as, for example, repairs along a length of transmission line or group of street lighting standards. In such case, it is preferable that the work platform be capable of a wide operating range so that repairs may be made without repeated movement of the vehicle upon which the work platform is mounted.

Therefore, it is a primary object of the present invention to provide a boom-supported work platform which is extremely flexible in its operation, is capable of being moved to any position within a wide range, and may be conveniently stopped and locked in any such position.

It is another object of the present invention to provide a work platform supported by a unique boom assembly such that the work platform is not only capable of 360 degree rotation about a vertical axis, but is also capable of vertical movement throughout an arc in excess of 180 degrees so as to provide a high degree of flexibility in operation.

It is another object of the present invention to provide a boom-supported work platform wherein the work platform is maintained in a level condition throughout any movement of the boom assembly.

It is another object of the present invention to provide a boom-supported work platform the location of which can be controlled by workmen on the platform when it is in an elevated position.

With the above and other objects in view, my invention resides in the novel features of form, construction, arrangement, and combination of parts presently described and pointed out in the claims.

In the accompanying drawings (four sheets)—

FIG. 1 is a side elevational view of a motor vehicle equipped with a boom-supported work platform constructed in accordance with and embodying the present invention;

FIGS. 2, 3, 4, 5, and 6 are side elevational views, similar to FIG. 1, showing the boom assembly and work platform in a number of operative positions;

FIG. 7 is a side elevational view of the work platform and boom assembly;

FIG. 8 is a fragmentary elevational view taken along line 8—8 of FIG. 7 showing the base and mast assembly;

FIG. 9 is a fragmentary sectional view taken along line 9—9 of FIG. 7;

FIG. 10 is a fragmentary top plan view taken along line 10—10 of FIG. 7 showing the joint between the mast and inner boom;

FIG. 11 is a fragmentary elevational view taken along line 11—11 of FIG. 7 showing the joint between the inner and outer booms and the sprocket assembly therein;

FIG. 16 is a diagrammatic view of the hydraulic system forming a part of the present invention.

Figure 1:
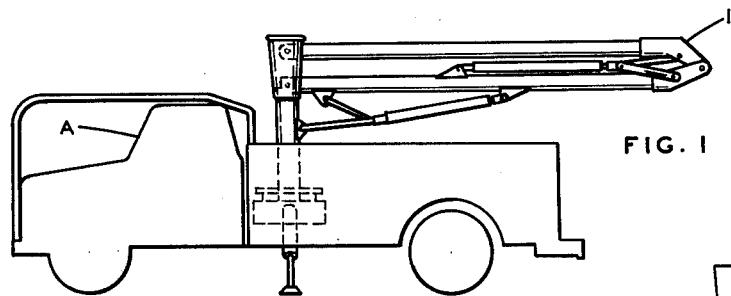
Figure 2:
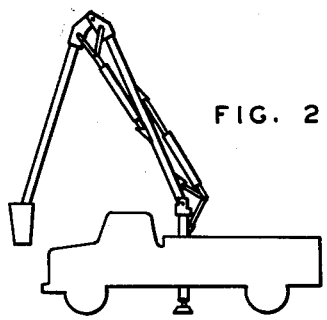
Figure 3:
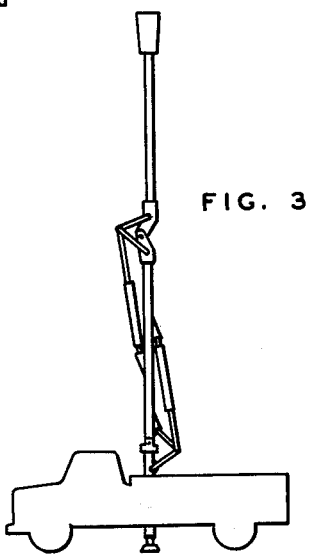
Figure 4:
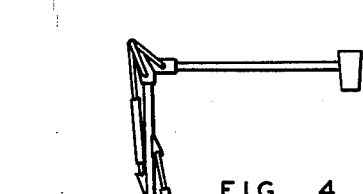
Figure 5:
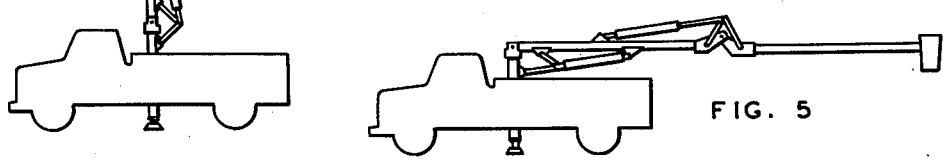
Figure 6:
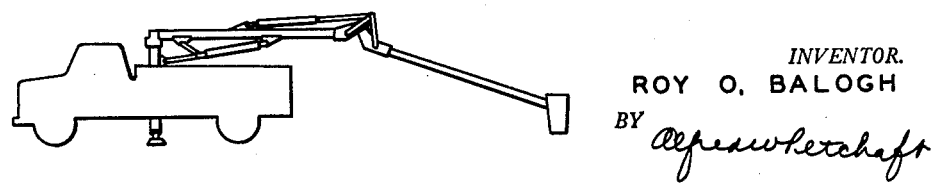

Referring now in more detail and by reference characters to the drawings, which illustrate a preferred embodiment of the present invention, A generally designates a truck having mounted thereon a boom-supported work platform 1 constructed in accordance with the present invention, and comprising a base frame 2 having outwardly projecting channel members 3, 4, operatively provided at their outer ends with conventional hydraulic outriggers 5, 6, which include conventional hydraulically actuated rods 7, 8. Rockably secured to the lower ends of the rods 7, 8, are ground engaging foot plates 9, 10.

Figure 13:
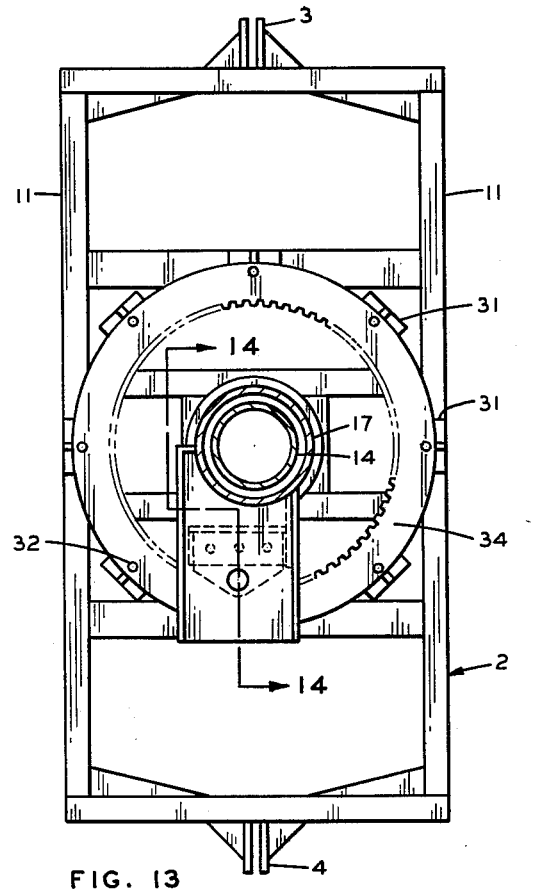
FIG. 13 is a fragmentary sectional view taken along line 13—13 of FIG. 12.
Figure 15:
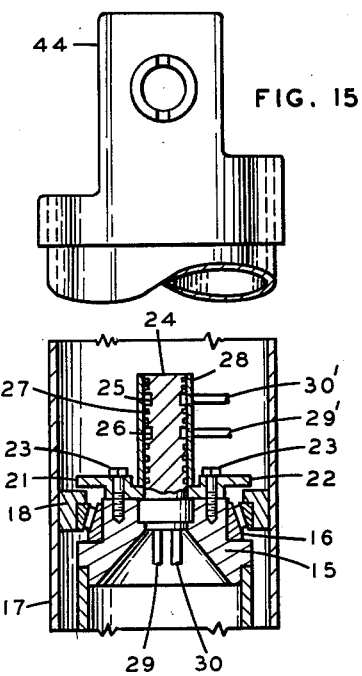
FIG. 15 is a fragmentary sectional view taken along line 15—15 of FIG. 8.
Figure 12:
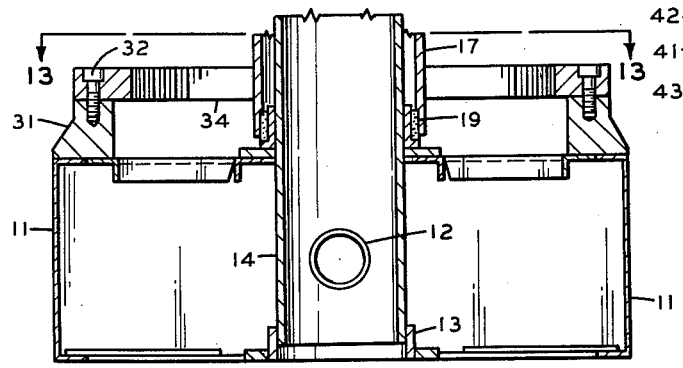
FIG. 12 is a fragmentary sectional view of the base and mast structure taken along line 12—12 of FIG. 8.
Figure 14:
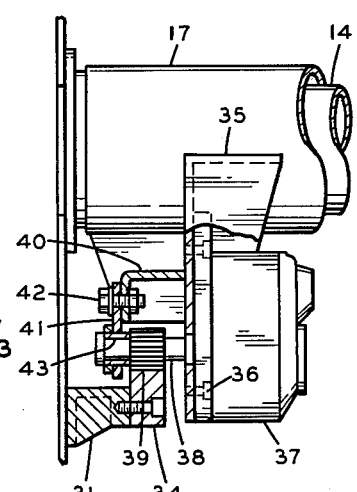
FIG. 14 is a fragmentary sectional view taken along line 14—14 of FIG. 13.

As seen by FIGS. 12 and 13, the base frame 2 is constructed of conventional longitudinal channel members 11 and sleeve 12 welded or otherwise suitably secured together to provide a rigid structure. Rigidly secured to the base frame 2 by means of a retainer member 13 is a stationary vertical mast 14 provided at its upper end with a cap-like member 15 adapted to receive and support a thrust bearing 16. Concentrically mounted around the inner stationary mast 14 and rotatably supported thereon by the thrust bearing 16 is an upstanding rotatable outer mast 17 provided with a bearing retainer 18 rigidly secured thereto for cooperative engagement with the thrust bearing 16. Mounted on the inner stationary mast 14 and positioned for operative engagement with the lower end of the outer mast 17 is a lower bearing 19. Relative axial movement between the inner stationary mast 14 and the outer rotatable mast 17 is prevented by means of a pair of retainer members 21, 22, which slidably engage the bearing retainer 18 and are secured by bolts 23 to the cap-like member 15. Also secured to the cap-like member 15 by means of retainer members 21, 22, is a stationary member 24 provided with a pair of circumferentially extending grooves 25, 26, a plurality of resilient sealing rings 27, and an externally fitted sleeve 28. Hydraulic lines 29, 30, are connected into the stationary member 24 and the matching hydraulic lines 29', 30', are connected into the sleeve 28 for purposes presently more fully appearing.

Rigidly affixed to the base frame 2 are a plurality of gear mounting brackets 31, and secured thereto by means of bolts 32 is an internal ring gear 34. Welded to the rotatable mast 17 and projecting horizontally outwardly therefrom is a motor supporting bracket 35 and rigidly mounted thereon by means of bolts 36 is a hydraulic motor and speed reducer unit 37, provided with a shaft 38 and pinion 39 for engaging the ring gear 34. Also welded to the bracket 35 is a channel member 40 having a laterally projecting horizontal plate 41 secured thereto by bolts 42. Mounted in the plate 41 is a bearing sleeve 43 adapted to receive and support the lower end of the shaft 38.

Rigidly mounted upon the upper end of the rotatable mast 17 is a top-casting 44 having heavy upstanding ears 45, 45', which are fitted with axially aligned bushings 46, 46', for receiving a horizontal journal pin 47, the latter being held non-rotatably therein by means of lock pins 48, 48'. Pivotally mounted upon the journal pin 47 by means of anti-friction bushings 49, 49', is an inner boom 50 which is of generally hollow tubular construction and is cut away at its lower end in the region of the journal pin 47 to define a clevis-like opening 51. Rigidly fitted upon the outer end of the boom 50 is a forked casting 52 having spaced parallel arms 53, 54, for supporting horizontal pivot pins 55, 56.

Similarly provided for pivotal movement around the outer end of the boom 50 is an outer boom 57 having a rigidly secured forked casting 58 including spaced parallel arms 59, 59', which are in turn pivotally mounted on the pivot pin 56. Secured at its ends in and extending horizontally between the arms 59, 59', is a horizontal pivot pin 60.

Rigidly secured within the outer end of the boom 57 are axially aligned bearings 61, 61', for operatively receiving a shaft 62 which projects therethrough and at its projecting end is rigidly attached to a bucket or so-called "work platform" 63.

The inner boom 50 is elevated and lowered through the action of hydraulic cylinder 66 provided with a piston and a piston rod 67. A bracket 68 is mounted somewhat centrally of the ends of and projects from the underside of the inner boom 50, and pivotally secured thereto at 69 is a clevis 70 which in turn is secured to the end of piston rod 67. The outer end 71 of cylinder 66 is pivotally secured to a first link 72 and second link 73 at pivot pin 74. Brackets 75 and 76 are secured to the underside of inner boom 50 and outer mast 17, respectively; and the first link 72 is pivoted at pin 77 to bracket 75 located near the inner end of boom 50, while the second link 73 is pivoted at pin 78 to bracket 76. The outer boom 57 is actuated by hydraulic cylinder 79 provided with a piston and piston rod 80, the end of which has a clevis 81 secured thereon. Pivotally secured to clevis 81 by a pivot pin 82 is a third link 83 and a fourth link 84. The third link 83 is in turn pivotally secured by pivot pin 60 to the arms 59, 59' of the forked casting 58 which is in turn a part of the outer boom 57, and fourth link 84 is pivotally secured to the pivot pin 55 of the forked casting 52. The end portion 86 of cylinder 79 is pivotally secured by a pivot pin 88 on bracket 89 which is mounted on the upper side of the inner boom 50 in rearwardly spaced relation to bracket 68.

Rigidly pinned to the journal pin 47 within the clevis-like opening 51 is a sprocket 90 and similarly pinned to the shaft 62 is a companion sprocket 91. Freely journaled upon the pivot pin 56 is a short quill 92 which is integrally provided on opposite ends with sprockets 93, 94, the latter being operatively spaced between the arms 59, 59', by the bosses 95, 96, and the bushing 97.

Welded or otherwise secured to the forked casting 52 are spaced parallel bracket-plates 98, 99, supporting a pair of spaced horizontal shaft-forming bolts 100, 101, upon which idler sprockets 102, 103, are respectively journaled. It should be noted that sprockets 90, 93, and the idler sprockets 102, 103, are in planar alignment. The shaft-forming bolts 100, 101, are furthermore held in place by nuts 104, 105, respectively. Similarly welded or otherwise secured to the forked casting 58 is a bracket 106 supporting a pair of spaced parallel shaft-forming bolts 107, 108, upon which idler sprockets 109, 110, are respectively journaled. In this connection it should be noted that sprockets 91, 94, and idler sprockets 109, 110, are in planar alignment. The shaft-forming bolts 107, 108, are held in place by nuts 111, 112, respectively.

Trained around the sprocket 90 is a short length of roller chain 113 which is connected at its ends by turnbuckles 114, 115, and rods 116, 117, respectively, to conventional swivel joints s fastened to the corresponding ends of a similar short length of roller chain 118 trained around sprocket 93 and the idler sprockets 102, 103. Similarly trained around sprocket 91 is a short length of roller chain 119 which is connected by turnbuckles 120, 121, and rods 122, 123, respectively, to conventional swivel joints s fastened to the corresponding ends of a similar short length of roller chain 124 trained around sprocket 94 and idler sprockets 109, 110.

By reason of the unique positioning of the pivot points, the ends of the links 72, 73, 83, 84, and the hydraulic cylinders 66, 79, with respect to the rotatable mast 17 and the inner and outer boom as hereinbefore described, the bucket or work platform 63 will move in a vertical plane throughout an arc of more than 180 degrees. Thus, for example, the bucket 63 may assume any one of the positions shown in FIGS. 2 through 6 and an almost infinite number of intermediate positions.

Furthermore, the bucket 63 is at all times maintained in a level position. For example, if the outer boom 57 is elevated while the inner boom member is maintained in a horizontal position, the bearings 61, 61', will move with respect to the fixed bucket shaft 62. Any rotation of the bucket shaft 62 will be prevented by the sprocket leveling assembly which is locked in position by sprocket 90 rigidly secured to journal pin 47. When the inner boom member is elevated from the position shown in FIG. 7, the sprockets 93, 94, will rotate in a clockwise direction (viewed from FIG. 7) causing sprocket 91 on bucket shaft 62 to also rotate in a clockwise direction and thereby maintain the bucket in a level position. The turnbuckles permit an initial leveling adjustment of the bucket prior to operation of the booms.

The hydraulic system for actuating the outriggers 5, 6, the main post motor 37, and the boom cylinders 66, 79, is diagrammatically shown in FIG. 16. A pair of control valves 200, 201, mounted at any convenient location on the base frame 2 is used to admit hydraulic fluid under pressure to the outriggers 5, 6. A three bank valve group 202 located at the mast 17, and a similar valve group 203 located on the bucket 63 is provided in order that the main post motor and boom cylinders may be controlled either at the mast 17 or by workmen in the bucket 63. Thus, the main post motor 37 may be controlled by valves 202a or 203a; the outer boom cylinder 79 may be controlled by valves 202b or 203b; and the inner boom cylinder 66 may be controlled by valves 202c or 203c. The maximum speed of movement of the motor and cylinders is regulated by conventional flow control valves V. Lines 29, 30, are high pressure and return lines, respectively. Except at the stationary member 24 and sleeve 28, the hydraulic fluid is transmitted in conventional flexible hydraulic lines. The pump P and oil reservoir R are preferably located on the truck in any convenient manner and the pump is actuated by a suitable power take-off from the truck transmission. The pump and power take-off, being conventional, are not shown or described in detail.

It should be understood that changes and modifications in the form, construction, arrangement, and combination of the several parts of the mobile work platforms may be made and substituted for those herein shown and described without departing from the nature and principle of my invention.

Having thus described my invention, what I claim and desire to secure by Letters Patent is:

1. An articulated boom-assembly comprising a base, an upstanding support member operatively mounted on the base for rotation about an upright axis which is substantially perpendicular to the base, a first boom operatively mounted on the upper end of the support member for pivoting about a first pivot axis which is substantially perpendicular to the upright axis of the support member, first power actuated means operatively connected between the first boom and the support member, said first power actuated means including two links which are pivotally connected at one end to each other and are swingably connected at their other ends to the first boom and support respectively so as to straddle the first pivot axis, said links being conjointly connected for pivoting movement to the first power actuated means so as to hold said means in laterally offset relation to said first pivot axis, whereby to swing said first boom from a substantially horizontal position to an upright position through an arc substantially in excess of 90°, said first boom being provided at its outer end with a first hinge-forming bracket-element which carries pivot-forming means having a pivot axis substantially parallel to said first pivot axis and located outwardly and upwardly from the outer end of the first boom when the first boom is in said horizontal position, a second boom adapted to assume an overlying position in relation to the first boom when said first boom is in said horizontal position, said second boom having an inner end and an outer end, said second boom being provided at its inner end with a hinge-forming bracket-element which carries pivot-forming means located downwardly and outwardly from the inner end of the second boom when the second boom is in overlying position with relation to the first boom, the pivot-forming means of the second boom being operatively engaged with the pivot-forming means of the first boom whereby to establish articulated connection between said booms about a second pivot axis which is parellel to the first pivot axis, said bracket-elements being adapted to fit within one another in such a manner as to establish sufficient clearance between themselves and between the proximate ends of the two booms whereby the two booms may swing with respect to each other through an arc of substantially 250°, second power actuated means operatively connected between the first and second booms, said second power actuated means also including two links which are pivotally connected at one end to each other and are swingably connected at their other ends to the first and second booms respectively so as to straddle the second pivot axis, said links being conjointly connected for pivoting movement to the second power actuated means so as to hold said second power actuated means in laterally offset relation to the second pivot axis, whereby to swing said booms in relation to each other through said last-named arc of substantially 250°, said second boom being provided at its outer end with laterally projecting pivot means, the axis of which is substantially parallel to the other pivot axes, a work platform operatively mounted on and carried by the laterally projecting pivot means, and means for rotating said work platform with respect to the second boom so as to maintain said work platform in substantially horizontal position irrespective of the relative positions of the two booms so that, while the support means remains stationary without rotation, the work platform is capable of movement to any selected position within an arc of at least 180° and the booms are capable of combined rotation through cumulative arcs totaling in excess of 340°.

2. An articulated boom-assembly comprising a base, an upstanding support member operatively mounted on the base for rotation about an upright axis which is substantially perpendicular to the base, a first boom operatively mounted on the upper end of the support member for pivoting about a first pivot axis which is substantially perpendicular to the upright axis of the support member, a first longitudinally extensible hydraulic motor means pivotally connected at one end to the first boom outwardly therealong with respect to said first pivot axis and being operatively connected at its other end to a first pair of articulated links which are pivotally connected at one end to each other and are swingably connected at their other ends to the first boom and to the support member respectively thereby holding said first hydraulic motor means in laterally offset relation to the first pivot axis whereby to swing said first boom from a substantially horizontal position to an upright position through an arc substantially in excess of 90°, said first boom being provided at its outer end with a first hinge-forming bracket-element which carries pivot-forming means having a pivot axis substantially parallel to said first pivot axis and located outwardly and upwardly from the outer end of the first boom when the first boom is in said horizontal position, a second boom adapted to assume an overlying position in relation to the first boom when said first boom is in said horizontal position, said second boom having an inner end and an outer end, said second boom being provided at its inner end with a hinge-forming bracket-element which carries pivot-forming means located downwardly and outwardly from the inner end of the second boom when the second boom is in overlying position with relation to the first boom, the pivot-forming means of the second boom being operatively engaged with the pivot-forming means of the first boom whereby to establish articulated connection between said booms, said bracket-elements being adapted to fit within one another in such a manner as to establish sufficient clearance between themselves and between the proximate ends of the two booms whereby the two booms may swing with respect to each other through an arc of substantially 250° about a second pivot axis which is parallel to the first pivot axis, a second longitudinally extensible hydraulic motor means pivotally connected at one end to the first boom intermediate the ends thereof and being operatively connected at its other end to a second pair of articulated links which are pivotally connected at one end to each other and are swingably connected at their other ends to the first boom and to the second boom respectively thereby holding said second hydraulic motor means in laterally offset relation to the second pivot axis, said second boom being provided at its outer end with laterally projecting pivot means, the axis of which is substantially parallel to the other pivot axes, a work platform operatively mounted on and carried by the laterally projecting pivot means, and means for rotating said work platform with respect to the second boom so as to maintain said work platform in substantially horizontal position irrespective of the relative positions of the two booms so that, while the support means remains stationary without rotation, the work platform is capable of movement to any selected position within an arc of at least 180° and the booms are capable of combined rotation through cumulative arcs totaling in excess of 340°.

3. An articulated boom-assembly comprising a base, an upstanding support member operatively mounted on the base for rotation about an upright axis which is substantially perpendicular to the base, a first boom operatively mounted on the upper end of the support member for pivoting about a first pivot axis which is substantially perpendicular to the upright axis of the support member, first power actuated means operatively connected between the first boom and the support member, said first power actuated means including two links which are pivotally connected at one end to each other and are swingably connected at their other ends to the first boom and support respectively so as to straddle the first pivot axis, said links being conjointly connected for pivoting movement to the first power actuated means so as to hold said means in laterally offset relation to said first pivot axis, whereby to swing said first boom from a substantially horizontal position to an upright position through an arc substantially in excess of 90°, said first boom being provided at its outer end with a first hinge-forming bracket-element which carries pivot-forming means having a pivot axis substantially parallel to said first pivot axis and located outwardly and upwardly from the outer end of the first boom when the first boom is in said horizontal position, a second boom adapted to assume an overlying position in relation to the first boom when said first boom is in said horizontal position, said second boom having an inner end and an outer end, said second boom being provided at its inner end with a hinge-forming bracket-element which carries pivot-forming means located downwardly and outwardly from the inner end of the second boom when the second boom is in overlying position with relation to the first boom, the pivot-forming means of the second boom being operatively engaged with the pivot-forming means of the first boom whereby to establish articulated connection between said booms about a second pivot axis which is parallel to the first pivot axis, said bracket-elements being adapted to fit within one another in such a manner as to establish sufficient clearance between themselves and between the proximate ends of the two booms whereby the two booms may swing with respect to each other through an arc of substantially 250°, second power actuated means operatively connected between the first and second booms, said second power actuated means also including two links which are pivotally connected at one end to each other and are swingably connected at their other ends to the first and second booms respectively so as to straddle the second pivot axis, said links being conjointly connected for pivoting movement to the second power actuated means so as to hold said second power actuated means in laterally offset relation to the second pivot axis, whereby to swing said booms in relation to each other through said last-named arc of substantially 250°, said second boom being provided at its outer end with laterally projecting pivot means, the axis of which is substantially parallel to the other pivot axes, a work platform operatively mounted on and carried by the laterally projecting pivot means, and means for rotating said work platform with respect to the second boom so as to maintain said work platform in substantially horizontal position irrespective of the relative positions of the two booms so that, while the support means remains stationary without rotation, the work platform is capable of movement to any selected position within an arc of at least 180° and the booms are capable of combined rotation through cumulative arcs totaling in excess of 340°, said last-named means including rotatable members mounted in the hinge-forming bracket-elements of the first and second booms for transmitting the level-position maintaining force along angular lines with respect to the longitudinal axes of the first and second booms.

4. An articulated boom-assembly as defined in claim 1 and further characterized in that the hinge-forming bracket-elements are clevis-like in construction so that the hinge-joint formed by the interconnection thereof is substantially hollow in its interior, said hinge-joint formed between the hinge-forming bracket-elements including a pintle, sprocket means operatively carried by the pintle, idler sprockets journaled in and carried by each of the hinge-forming bracket-elements, sprocket-chain means operatively trained around the sprocket means and the idler sprockets, a position-controlling sprocket operatively mounted on the support member, and a follower sprocket operatively associated with the work platform, said sprocket-chain means being trained around the position-controlling sprocket and the follower sprocket whereby to effect said horizontal position maintenance of the work platform.

References Cited in the file of this patent
UNITED STATES PATENTS

| | | |
|---|---|---|
| 2,360,654 | Day | Oct. 17, 1944 |
| 2,450,152 | Miller | Sept. 28, 1948 |
| 2,500,815 | Gerli et al. | Mar. 14, 1950 |
| 2,565,792 | Wagner et al. | Aug. 28, 1951 |
| 2,616,768 | Stemm | Nov. 4, 1952 |
| 2,674,500 | Hukari | Apr. 6, 1954 |
| 2,682,432 | Schmidt | June 29, 1954 |
| 2,724,620 | Johnson et al. | Nov. 22, 1955 |
| 2,786,580 | Balogh | Mar. 26, 1957 |
| 2,815,250 | Trump | Dec. 3, 1957 |